United States Patent
Zimrin et al.

(10) Patent No.: US 9,413,001 B2
(45) Date of Patent: Aug. 9, 2016

(54) FUNCTIONALIZED CARBON NANOTUBE COMPOSITE

(75) Inventors: Tomer Zimrin, Kiryat Ono (IL); Roni Shapira, Ramat Gan (IL); Doron Aurbach, Bnei Brak (IL); Beni Cahana, Nesher (IL)

(73) Assignees: BAR ILAN UNIVERSITY, Ramat Gan (IL); VULCAN AUTOMOTIVE INDUSTRIES LTD., Yavne (IL)

( * ) Notice: Subject to any disclaimer, the term of this patent is extended or adjusted under 35 U.S.C. 154(b) by 82 days.

(21) Appl. No.: 14/233,854

(22) PCT Filed: Jul. 19, 2012

(86) PCT No.: PCT/IL2012/050263
§ 371 (c)(1),
(2), (4) Date: Jan. 20, 2014

(87) PCT Pub. No.: WO2013/011516
PCT Pub. Date: Jan. 24, 2013

(65) Prior Publication Data
US 2014/0162111 A1    Jun. 12, 2014

Related U.S. Application Data

(60) Provisional application No. 61/509,787, filed on Jul. 20, 2011, provisional application No. 61/556,878, filed on Nov. 8, 2011.

(51) Int. Cl.
*H01M 4/36* (2006.01)
*H01M 4/68* (2006.01)
(Continued)

(52) U.S. Cl.
CPC .............. *H01M 4/366* (2013.01); *B82Y 30/00* (2013.01); *H01G 11/36* (2013.01); *H01M 4/16* (2013.01); *H01M 4/36* (2013.01); *H01M 4/38* (2013.01); *H01M 4/56* (2013.01); *H01M 4/68* (2013.01);
(Continued)

(58) Field of Classification Search
CPC ......... H01M 4/366; H01M 4/16; H01M 4/38; H01M 4/56; H01M 4/36; H01M 4/68; H01M 10/12; H01G 11/36; B82Y 30/00; Y02E 60/13; Y02E 60/126; Y01S 977/948; Y10S 977/742; Y02P 70/54
See application file for complete search history.

(56) References Cited

U.S. PATENT DOCUMENTS 7,507,496 B1 * 3/2009 Kinsbursky et al. ............ 429/49
8,475,961 B2   7/2013 Bosnyak et al.
(Continued)

FOREIGN PATENT DOCUMENTS

CN  101246961 A    8/2008
CN  101320800    * 12/2008  .............. H01M 4/36
(Continued)

OTHER PUBLICATIONS

Blair, "Lead oxide technology—Past, present, and future", Journal of Power Sources, vol. 73, pp. 47-55, (1998).
(Continued)

*Primary Examiner* — Patrick Ryan
*Assistant Examiner* — Aaron Greso
(74) *Attorney, Agent, or Firm* — Vorys, Sater, Seymour & Pease LLP (57) ABSTRACT

Provided is a composite including lead oxide particles ($PbO_2$) and functionalized carbon nanotubes (CNTs).

20 Claims, 11 Drawing Sheets (51) Int. Cl.
*H01M 4/38* (2006.01)
*H01M 4/56* (2006.01)
*H01M 4/16* (2006.01)
*H01M 10/12* (2006.01)
*B82Y 30/00* (2011.01)
*H01G 11/36* (2013.01)

(52) U.S. Cl.
CPC .............. *H01M 10/12* (2013.01); *Y02E 60/126* (2013.01); *Y02E 60/13* (2013.01); *Y02P 70/54* (2015.11); *Y10S 977/742* (2013.01); *Y10S 977/948* (2013.01)

(56) References Cited

U.S. PATENT DOCUMENTS

| | | | |
|---|---|---|---|
| 2006/0062983 A1* | 3/2006 | Irvin et al. | 428/220 |
| 2006/0274049 A1* | 12/2006 | Spath et al. | 345/173 |
| 2008/0038635 A1 | 2/2008 | Sheem et al. | |
| 2009/0142665 A1 | 6/2009 | Sheem et al. | |
| 2010/0173228 A1* | 7/2010 | Wallace et al. | 429/532 |
| 2012/0328940 A1 | 12/2012 | Bosnyak et al. | |

FOREIGN PATENT DOCUMENTS

| | | | |
|---|---|---|---|
| CN | 101320800 A | 12/2008 | |
| CN | 101440008 A | 5/2009 | |
| CN | 101440010 A | 5/2009 | |
| JP | 2007-213859 * | 8/2007 | .............. Y02E 60/50 |
| JP | 2008-98009 A | 4/2008 | |
| WO | WO 2008/070914 * | 6/2008 | .............. H01M 4/00 |
| WO | 2009/155267 A1 | 12/2009 | |
| WO | 2011/029130 A1 | 3/2011 | |
| WO | 2011/130127 A1 | 10/2011 | |

OTHER PUBLICATIONS

Chahmana et al., "Influence of some metal ions on the structure and properties of doped β-PbO2", Journal of Power Sources, vol. 191, pp. 51-57, (2009).

Chiang et al., "Surface characterization of acid-oxidized multi-walled carbon nanotubes", Toxicological & Environmental Chemistry, vol. 91, No. 8, pp. 1413-1427, (2009).

Endo et al., "Applications of carbon nanotubes in the twenty-first century", Phil. Trans. R. Soc. Lond. A., vol. 362, pp. 2223-2238, (2004).

Goldman et al., "An easy method for the production of functional polypyrrole/MWCNT and polycarbazole/MWCNT composites using nucleophilic multi-walled carbon nanotubes", Carbon, vol. 48, pp. 4170-4177, (2010).

Harris, "Carbon nanotube composites", International Materials Review, vol. 49, No. 1, pp. 31-43, (2004).

The International Search Report for International Application No. PCT/IL2012/050263, four pages, mailed Oct. 23, 2012.

Lellouche et al., "A reversible decoration of multi-walled carbon nanotubes (MWCNTs) by acyclic η4-(1E,3E)-dienyl-Fe(CO)3 complexes", J. Mater. Chem., vol. 18, pp. 1093-1099, (2008).

Moseley et al., "In celebration of the sesquicentennial of the lead-acid battery", Journal of Power Sources, vol. 195, p. 4423, (2010).

Philip et al., "A novel nanocomposite from multiwalled carbon nanotubes functionalized with a conducting polymer", Smart Mater. Struct., vol. 13, pp. 295-298, (2004).

Plante, "Physics—New high-power secondary battery", C.R. Acad. Sci. Paris, vol. 50, pp. 640-642, (1860). English translation attached separately.

Ruetschi, "Review on the Lead-Acid Battery Science and Technology", Journal of Power Sources, vol. 2, pp. 3-24, (1977/1978).

Strano et al., "The Role of Surfactant Adsorption during Ultrasonication in the Dispersion of Single-Walled Carbon Nanotubes", J. Nanosci. Nanotech., vol. 3, pp. 81-86, (2003).

Suslick et al., "Applications of Ultrasound to Materials Chemistry", Annu. Rev. Mater. Sci., vol. 29, pp. 295-326, (1999).

Vaisman et al., "The role of surfactants in dispersion of carbon nanotubes", Advances in Colloid and Interface Science, vol. 128-130, pp. 37-46, (2006).

Wang et al., "Effect of MWCNTs as Additives in Lead Acid Battery", Journal of Materials Science & Engineering, vol. 25, No. 6, pp. 932-934; (2007).

\* cited by examiner

FUNCTIONALIZED CARBON NANOTUBE COMPOSITE

TECHNOLOGICAL FIELD

This invention relates to novel uses of functionalized carbon nanotubes in lead acid batteries.

BACKGROUND

The lead-acid battery has been a successful secondary battery system for over a century [1]. The advantages of these batteries are their low cost, stable voltage profile, high reliability, and safety. The main disadvantages of such flooded type configuration are a low specific energy and, subsequently, the poor utilization of the positive active-material (PAM). Both the cycle life and the capacity of these batteries are limited due to the properties of the active material in the positive plate. Compared to the negative plate, the positive plate has low performance in deep discharge (high DOD), and therefore much research has been conducted to improve the performance of lead-acid batteries [2].

The low utilization of PAM stems from the associated sulfation and crumbling of the active material. The crumbling of the active material originates from the significant difference between the densities of the $PbO_2$ and $PbSO_4$, leading to expansion of the active material that occurs during the discharge process [3]. During discharging, non-conductive crystals of $PbSO_4$ are formed. When these electrically insulating crystals grow, as either plates or spatial crystals, they either prevent the lead ion oxidation back to the active $PbO_2$ material or reach a stable crystal size (above 1-1.5 micron in diameter), which cannot be recharged via the common dissolution/precipitation mechanism.

Carbonaceous additives were studied mainly for negative active materials of valve-regulated lead acid (VRLA) cells. Amongst others, their contribution may be associated to the enhancement of the overall conductivity of the active material, facilitation of the formation of small isolated $PbSO_4$ particles which are easy to dissolve, and the ability of carbon to act as an electro-osmotic pump that facilitate acid diffusion within the inner volume of the active material, especially at high rates of charge and discharge. Pavlov et al. [4] suggested a mechanism for the role of the carbonaceous additives in the negative active material. According to the proposed mechanism, the lead sulfate dissolves and diffuses to conductive sites (i.e. pure lead, extremely thin lead sulfate layer or the carbonaceous additives surface), in which it may be reduced into metallic lead due to its sufficient electrical conductivity. At later stages, due to the mismatch in the crystal lattice parameters, the reduced lead diffuses from the carbon surface, releasing the electro-active sites on the carbonaceous surface to be available for further reduction.

Among the various carbon allotropes, carbon nanotubes (CNTs) seem to be a prominent additive due to their outstanding features, including high mechanical properties, and excellent electric and thermal conductivities. Many of these properties are best exploited by incorporation of CNTs into composites [5]. The extremely high aspect ratio of the CNT (up to $10^6$) turns the formation of dispersion into a challenge, as there is a need to overcome all of the local Van der Waals interactions which tend to hold the CNTs macro-scale bundles intact [6].

Chemical methods have been used to surface-functionalize CNTs to improve their chemical compatibility with a target medium (solvent or polymer solution/melt), to enhance wetting or adhesion characteristics and reduce their tendency to agglomerate [7].

REFERENCES

[1] Planté, G., C.R. Acad. Sci. Paris 1860, 50, 640-642
[2] Moseley, P. T.; Rand, D. A. J., J. Power Sources 2010, 195 (14), 4423-4423
[3] Ruetschi, P., J. Power Sources 1977, 2 (ACS), 3-24
[4] Pavlov, D.; Rogachev, T.; Nikolov, P.; Petkova, G., J. Power Sources 2009, 191, 58-75
[5] Vaisman, L.; Wagner, H.; Marom, G., Adv. Colloid and Interf. Sci. 2006, 128-130, 37-46
[6] Strano, M. S., J. Nanosci. Nanotech. 2003, 3 (1/2), 81-86
[7] Harris, P. J. F., Intl. Mater. Rev. 2004, 49 (1), 31-43
[8] Lellouche, J.-P.; Piran, M.; Shahar, L.; Grinblat, J.; Pirlot, C., J. Mater. Chem. 2008, 18 (10), 1093-1099
[9] Suslick, K. S.; Price, G. J., Annu. Rev. Mater. Sci. 1999, 29, 295-326
[10] Goldman, D.; Lellouche, J.-P., Carbon 2010, 48 (14), 4170-4177
[11] WO 2011/029130
[12] Chiang Y. C. et al; Toxicol. Environ. Chem. 2009, 91 (8), 1413-1427

SUMMARY OF THE INVENTION

The inventors of the invention disclosed herein have developed composites (composition of matter) containing functionalized carbon nanotubes (CNTs), e.g., for use as electrode materials in electrochemical cells such as lead-acid batteries. The composites of the invention allow the construction of electrodes in electrochemical cells, e.g., as a lead acid cathode, which are capable of surviving the cathodic potential and the acidic conditions in the battery, e.g., lead acid cell.

In one aspect, the present invention provides a composite comprising lead oxide particles ($PbO_2$) and functionalized carbon nanotubes (CNTs), said functionalized CNTs being randomly distributed, in spaced-apart fashion in said composite, each functionalized CNT being coated with a plurality of said lead oxide particles, e.g., the particles having an average size in the micron scale, ranging between 0.2 and 2 microns in diameter.

The "CNTs" employed in the products and methods of the invention are carbon nanowires selected in a non-limited fashion from single-walled carbon nanotubes (SWCNTs), multi-walled carbon nanotubes (MWCNTs), double-walled carbon nanotubes (DWCNTs), few-walled carbon nanotubes (FWCNTs), each may or may not be further functionalized (substituted by one or more organic or inorganic non-carbon atom or group). In some embodiments, the CNTs are single-walled (SWCNTs) or multiwalled (MWCNTs) CNTs.

In some other embodiments, the composite further comprises carbon black. The lead oxide (LO) particles of the invention may be of any shape and of random or preselected particle size. The term "particle size" typically refers to the average diameter of the particles. When the particles are of non-spheroid shape, the term refers to the average equivalent diameter of the particle, namely the diameter of an equivalent spherical particle based on the longest dimension of the particle.

In the composite of the invention, the functionalized CNTs are substantially not in a preordered contact with each other, namely, they are "randomly distributed in a spaced-apart fashion", each being separable from the other by a plurality of lead oxide particles coating and protecting each functionalized CNT. In other words, the functionalized CNTs form a discontinuous net or a fragmented grid, wherein each functionalized CNT is distanced from the other by at most about 1 or 2 microns.

The composite of the present invention exhibits superior characteristics in comparison to composites in which pristine CNTs are dispersed in the lead oxide, these superior characteristics being at least in composite morphology, and as reflected in battery operation, in at least enhanced electrical cycle ability and delayed cathode failure. Contrary to the highly hydrophobic nature of pristine CNT, which does not wet the lead oxide due to significant mismatch of their surface energies (resulting in a clear and fast phase separation), the functionalized CNTs employed in composites of the invention wet the lead oxide particles, resulting in a composition of high stability and homogeneity.

Further, in contrast to known composites, such as those disclosed in WO 2011/029130 [11], in the composite of the invention the CNTs are distributed in a space-apart fashion, whereby substantially no continuous carbon-carbon structures are formed. As the CNTs are in a concentration slightly above the percolation concentration, electrical conductivity is maintained, without the need to form a continuous carbonaceous grid.

As will be demonstrated hereinbelow, the electric conductivity of the functionalized CNTs and its homogeneous dispersion in the lead oxide, as well as the functionalized CNTs wetting of the lead oxide, ensures that in a functioning cell most of the $PbSO_4$ crystals remain in the submicron size, which minimizes eventual sulfur concentration (i.e. "sulfation"). This clearly indicates that the functionalized CNTs manage to form conductive spatial non-continuous arrangement, which enables the functionalized CNTs to act as "electron sinks", i.e., enabling the creation of oxidation sites which significantly delays failure due to sulfation, resulting in enhanced cycle life of the cell.

The CNTs used in a composite of the invention are "functionalized", namely the CNTs bare one or more functional groups which is associated with the CNT external carbon surface. In some embodiments, the CNTs are oxidized to afford oxygen-containing groups such as carboxyl and hydroxyl groups. The oxidation of CNTs may be achieved by wet chemical methods, photo-oxidation, oxygen plasma or gas phase treatment, as known in the art. Thus, in some embodiments, the functionalized CNT is oxidized CNT.

In other embodiments, the oxidized CNTs are further functionalized for bonding with at least one polymer. In some embodiments, functionalization is achieved via ester bonds where the acid moiety is carried by the oxidized CNT or by the functionalizing moiety.

In some embodiments, the CNTs are functionalized with polymers, e.g., conductive polymers, which assist in preventing physical and/or conductive disconnection of portions of an electrode. According to the present invention, the CNTs may also be functionalized by polymers, which may be conductive and/or which can undergo electrochemical doping, e.g., p-doping or n-doping, thereby functioning as an electrolytic capacitor.

The oxidized CNTs, e.g., single walled or multiwalled, (being, in some embodiments, functionalized CNTs in accordance with the invention) may thus be functionalized through one or more of the oxygen-containing groups, and may be further functionalized with at least one suitably functionalization polymer to afford, in other embodiments, other and different functionalized CNTs in accordance with the invention. In some embodiments, the polymer is selected to have on average between about 10 and about 200 repeating monomeric units. In other embodiments, the polymer is selected to have a molecular weight between about 1,500 and 30,000 Da (Dalton).

In some embodiments, the CNTs are functionalized with at least one semiconductive polymer. In some embodiments, the polymer is selected from polythiophene, polyaniline polypyrrol and poly(3,4-ethylenedioxythiophene) (PEDOT).

According to some embodiments, said polymer is polythiophene.

In some embodiments, the functionalized CNT is polythiophene-functionalized CNT. In such embodiments, the CNT may be multiwalled CNT (MWCNT).

In some other embodiments, the CNT is oxidized (to bear a plurality of oxygen-containing groups) and subsequently reacted with a suitably functionalized polymer moiety. The polymer moiety, selected as above, bears in some embodiments, a plurality of carboxylic acid groups (as is the case with the exemplary polythiophene acetic acid (PTAA)), which are capable of interacting with the oxygen-containing groups on the surface of the CNT.

In some embodiments, the functionalized CNTs are MWCNT, having a diameter of between about 8 and 15 nm, and a length of between about 10 and 50 μm; the functionalized MWCNTs being covalently bonded to a plurality of polythiophene moieties.

In some embodiments, the concentration of the functionalized CNT in a composite of the invention is between about 0.05% and 5% (wt %) of the total lead oxide weight. In further embodiments, the concentration is between about 0.1% and 5% (wt %). In still further embodiments, the concentration is between about 1% and 5% (wt %).

In some embodiments, the concentration is between about 0.05% and 1% (wt %). In other embodiments, the concentration is between about 0.05% and 2% (wt %). In additional embodiments, the concentration is between about 0.1% and 1% (wt %). In still other embodiments, the concentration is between about 0.1% and 2% (wt %).

In another aspect, the invention provides a composite comprising functionalized MWCNTs, and lead oxide particles ($PbO_2$), the functionalized MWCNTs being covalently bonded to a plurality of polythiophene moieties.

In another aspect, a composite comprising functionalized MWCNTs, and lead oxide particles ($PbO_2$), the MWCNTs being functionalized with oxygen-containing groups.

In some embodiments, the functionalized MWCNTs have a diameter of between about 8 and 15 nm, and a length of between about 10 and 50 μm. In other embodiments, the concentration of functionalized MWCNTs is between about 0.1% and 5% (wt %). In still other embodiments, the composite further comprises carbon black.

In a further aspect, there is provided a composition comprising the composite of the invention as herein described and an acidic medium. In other embodiments, the invention provides a composition comprising the composite of the invention as herein described and a medium at an acidic pH (between 1 and 7). The medium may be made acidic by inclusion of an acid selected from sulfuric acid and nitric acid.

In some embodiments, the acidic medium is sulfuric acid, which may be in a concentration of between about 1M and 20M (M being mole/liter).

The composite of the present invention may be processed into components of lead acid batteries, e.g., electrodes (cathode and/or anode). Thus, the invention also provides a processing method for application of a composite of the invention as an electrode in order to prevent or minimize creep deformation, inter-granular corrosion and cracking in lead acid batteries. For such applications and others, the composite may be provided in the form of a paste.

A composite of the invention, as an electrode active material, may be provided as a paste and applied on an electrode substrate. In some embodiments, the paste is applied or otherwise provided onto at least a portion of an electrode substrate and allowed to dry or cure to form an electrode plate. The lead acid battery may then be constructed.

The surface of the electrode may be the entire surface or a portion thereof. The "portion" (region) of the substrate's surface to be coated may be of any size and structure, the portion may be continuous or comprise of several non-continuous sub-regions on the surface. The electrode "substrate" may be a flexible or rigid structure, which may be substantially two-dimensional (a thin flat substrate) or a three-dimensional, e.g., curved (non-flat) surface. The substrate can be of any smoothness. In most general terms, the substrate may be of a solid material.

As known in the art, a lead acid battery comprises an electrode assembly (typically at least one anode and at least one cathode), a bus-bar, an electrolyte solution and housing. The electrode assembly and bus-bar may be made of either a cast or wrought lead alloy. While traditional lead acid batteries have proven to be dependable, they have a limited life span and energy density. The life span is typically limited by creep (growth), corrosion and cracking of the electrodes, as well as the formation of an insulating lead-sulfide layer, resulting from successive charge-discharge cycles, each of which disadvantages being minimized or resolved in a lead acid battery according to the present invention.

The invention thus provides an energy storage device (e.g., lead acid battery) comprising an electrode assembly, a bus-bar, an electrolyte solution and housing. In an energy storage device (e.g., battery) according to the invention, at least one of the electrodes constituting the electrode assembly is composed of a composite according to the invention. In some embodiments, the positive electrode is composed of a composite according to the invention.

According to some embodiments, the energy storage device is a lead-acid battery. In such embodiments, the electrolyte solution is typically a dilute aqueous sulfuric acid solution, comprising 3 to 5M sulfuric acid; the solution provides the sulfate ions necessary for the discharge reactions.

In some other embodiments, the lead-acid battery is operational for at least 150 cycles of operation between charging at 14V and discharging at 10.5V, at 25%±0.3% Depth of Discharge (DOD) of the initial capacity of the battery.

The invention further provides an electrode, e.g., a cathode, comprising, or having at least on a portion of its surface, a composite according to the invention.

In comparison to cathodes made of pure lead oxide and Dynel® fibers that demonstrated recharging over 180-253 cycles, measurements performed on a cathode of the invention demonstrated recharging over 387 cycles, with the Depth of Discharge (DOD) for the aforementioned cycles being 33±0.3% of the initial capacity.

Additionally, and as will be further detailed hereinbelow, high resolution SEM (HRSEM) supplemented by EDAX demonstrated that cathodes (without CNTs) containing a combination of large $PbSO_4$ crystals and a small amount of submicron crystals failed due to the combined sulfation-crumbling mechanisms. In contrast, functionalized CNT-impregnated cathodes exhibited only sub-micron crystals and an improvement in the failure mechanism.

In an aspect, the invention provides a process of manufacture of a dispersion of functionalized CNTs in lead oxide, the process comprising reacting CNTs being functionalized with oxygen-containing groups, under conditions permitting random distribution in spaced-apart fashion of said functionalized CNTs, each being coated with a plurality of said lead oxide particles.

In some embodiments, prior to distribution of said functionalized CNTs in said lead oxide, the process comprises reacting the functionalized CNTs with at least one polymer under conditions permitting covalent association of said at least one polymer onto said functionalized CNTs.

In another aspect of the invention, there is provided a process of manufacture of a dispersion of functionalized CNT in lead-oxide, the process comprising reacting oxidized CNTs (e.g., MWCNT, 8-15 nm diameter, 10-50 μm length) with at least one polymer (e.g., polythiophene acetic acid (PTAA)) under conditions permitting covalent functionalization of said at least one polymer onto said oxidized CNTs.

In some embodiments, said conditions involve mixing in a solvent permitting conjugation between the oxidized CNTs and the at least one polymer.

In other embodiments, said conditions involve mixing by planetary centrifugal mixing, e.g., at 2,000 rpm for 2 minutes.

In a further aspect, the invention provides a process for manufacturing electrode material, the process comprising:
  mixing a CNT/lead oxide dispersion (as above) with water and $H_2SO_4$ to obtain a paste;
  pasting said paste on a lead grid for electrode production;
  curing said electrode followed by formation of a conductive skeleton.

The curing is typically carried out at an oven in at elevated temperatures, suitable for evaporation of substantially all of the water from the paste.

In another aspect of the invention, contemplated is a lead acid battery system comprising one or more (or a plurality of alternating) positive and negative electrodes, at least one of said electrodes being an electrode according to the present invention; separator means disposed between said electrodes; an electrolyte solution being substantially in contact with said electrodes and separators, and a housing.

As mentioned herein, the formation of $PbSO_4$ is minimized when using an electrode or battery according to the invention. Therefore, in another aspect, the invention provides a process for operating a battery according to the present invention, the process comprising:
  constructing the energy storage device of the invention; and
  contacting and de-contacting said one or more negative electrode and one or more positive electrode in at least one cycle of operation.

In another aspect, there is provided a process for generating energy, comprising:
  providing an energy storage device according to the invention; and
  contacting and de-contacting said one or more negative electrode and one or more positive electrode in at least one cycle of operation.

The term "cathode" refers to the positively charged electrode, while the term "anode" refers to the negatively charged electrode of the cell.

The energy storage device (e.g. battery) according to the present invention may be utilized in a variety of applications.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF THE INVENTION

Example 1

Polymer Functionalized Oxidized-CNTs

Preparation of Test Samples

Dispersion of the coated CNTs in the leady-oxide medium for the positive mixtures were prepared from lead oxide (LO) produced by the Vulcan Plant in Israel, 0.2 wt. % Dynel® ⅛ (a copolymer of acrylonitrile and vinyl chloride), and 1.0 wt. % coated CNTs. The coated CNTs (NanoAmor MWCNT, 8-15 nm diameter, 10-50 μm length) were covalently coated with polythiophene acetic acid (PTAA), as described by Lellouche [8]. The mixtures were sonicated in a tip sonicator (750W) for 30 minutes with acetone as a conjugating agent.

Alternatively, viscous LO powder (containing small amounts of water) and oxidized MWCNT (Arkema, 1-10 μm length, see characterization in [12]) were mixed by planetary centrifugal mixing at 2000 rpm for 2 min followed by admixing with of 0.2 wt. % Dynel® ⅛. The oxidized MWCNT were produced by chemical vapor deposition method with diameter of 20-40 nm. 3 g portion of MWCNTs were added to 125 ml of 4M acid solution (sulfuric acid, nitric acid or a 1:1 mixture of sulfuric and nitric acids). Then the mixture was heated and refluxed in a Soxhlet apparatus at boiling temperature for 24 h. After being washed thoroughly with an excess of deionized water until the filtrate reached a pH value of ca. 7, the sample was dried at 103° C. under vacuum for 24 h.

Positive pastes were made from the above mixtures in addition to an auxiliary mixture without CNTs. Negative pastes were prepared from LO, 0.06 wt. % Dynel® 1/16, and an expander (VULCA01 by Hammond; consists of $BaSO_4$ and carbon black).

To both negative and positive mixtures, 0.75 wt. %. water (150 μg/g LO powder) and $H_2SO_4$ (16 μl/g LO powder; 1.84 g/cm³) were added. The mixtures were pre-reacted (1 h at room temperature), followed by pasting on a lead grid (area 4 cm², thickness 1.3 mm) for electrode production. The electrodes were cured (55° C., 100%RH, 48 h), followed by formation of the conductive skeleton (55° C., 20%RH, 24 h). Finally the electrodes were immersed in $H_2SO_4$ solution (1.05 g/cm³, 18 h), aiming towards exclusive β-structure of the lead oxide [9], followed by a charging process: constant current and constant voltage (CC/CV), (cut-off at 2.6V and 5.5 mA correspondingly with appropriate low derivative to ignore spikes).

Test cell design

The influence of the CNT additives on the performance of lead-acid cells was investigated using 2V polypropylene cells containing ca. 6-9 g negative and 3 g positive electrodes, glass separator, and 1.05 g/cm³ $H_2SO_4$ electrolyte solution that was refreshed once every 2 weeks with distilled water. All electrochemical procedures were conducted on a MSTAT 32 channel potentiostat (Arbin Instruments, College Station, Tex.) and included: complete discharge at rate lower then C/20 till 1.6V; verification that the capacity equals 97±2 mAh/g; 3 min OCV (open-circuit voltage); CC/CV (constant current/constant voltage) recharging (C/2 rate, 2.6V); 3 min OCV; 20 min discharge at C rate (the cell was determine as failed when it could not supply 1.6V till the end of the discharge); 3 min OCV; and back to the CC/CV recharge. Note that the term "C rate" refers to the cell's capacity (measured in Amp-hours), which is the theoretical amount of current the cell delivers when discharged in one hour to the point of 100% depth of discharge (DOD).

Results

Major differences were observed between the coated or oxidized MWCNTs dispersed in LO compared to the pristine MWCNTs dispersed in LO in terms of morphology, cycle ability, and cathode failure mechanism.

Figure 1A:
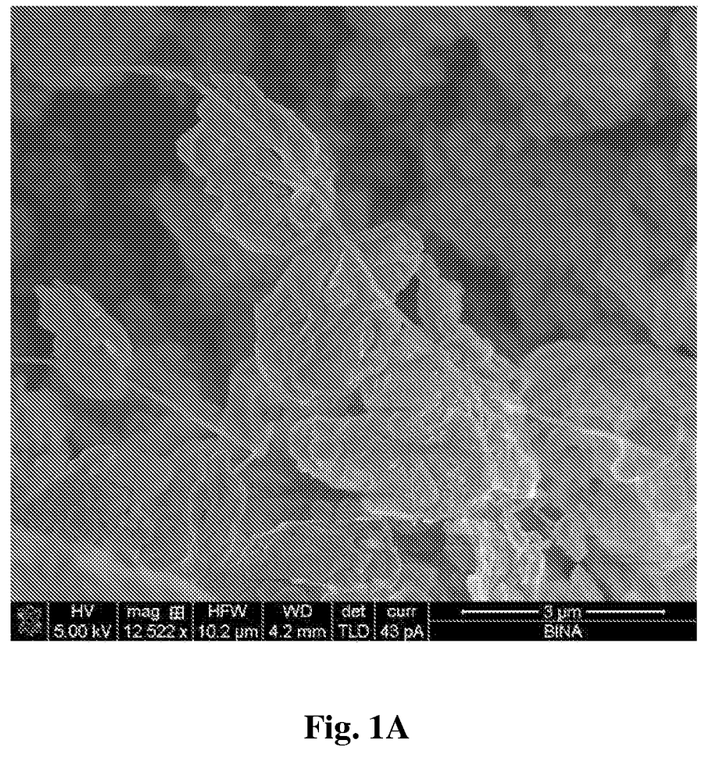
FIGS. 1A-B provide SEM images of a homogeneous mixture of lead oxide and CNTs.
Figure 1B:
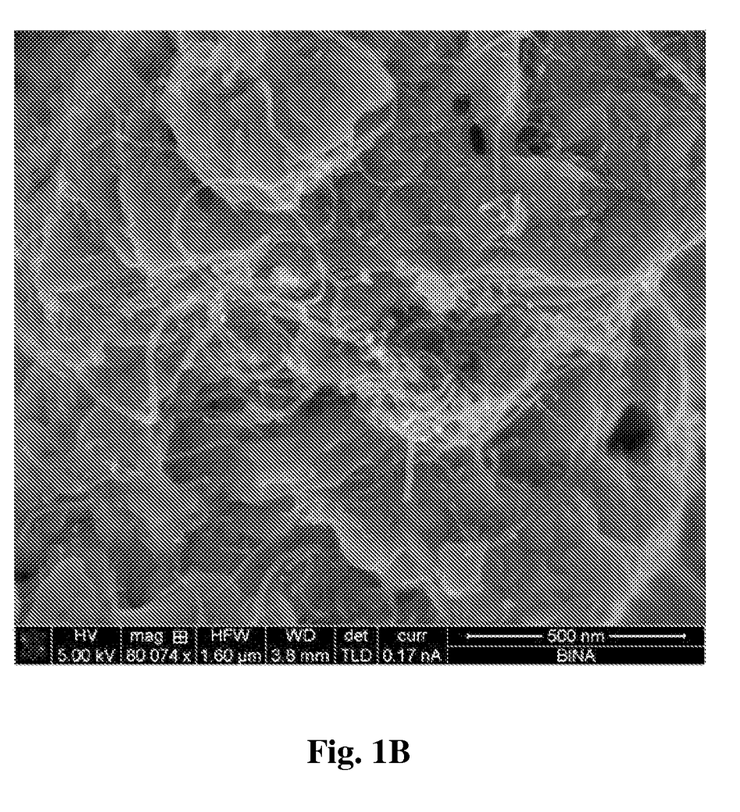

Both planetary centrifugal mixing at 2000 rpm of oxidized MWCNTs and viscous LO (containing small amounts of water) or high power horn sonication of PTAA-CNTs with LO utilizing small amounts of acetone as conjugating agent, lead to homogenous mixtures without signs of agglomeration when examined on HRSEM after drying (FIGS. 1A-B). Also noted, was that the CNTs maintained their initial length (i.e., CNTs were not chopped). In contrast, sonication at 25W of uncoated CNTs and ball milling in a zirconia canister using millimeter-scale zirconia balls led to a homogeneous mixture of chopped CNTs and LO.

The highly hydrophobic nature of the pristine CNTs, which do not wet LO due to a significant mismatch between their surface energies, often resulted in clear and fast phase separation. In contrary, as soon as the mixtures of the invention gained mobility (i.e. addition of solvents), both the oxidized CNTs and PTAA coated CNTs demonstrate stable homogenous mixture which hold at least few hours allowing complete assembly of the cathodes.

Figure 2A:
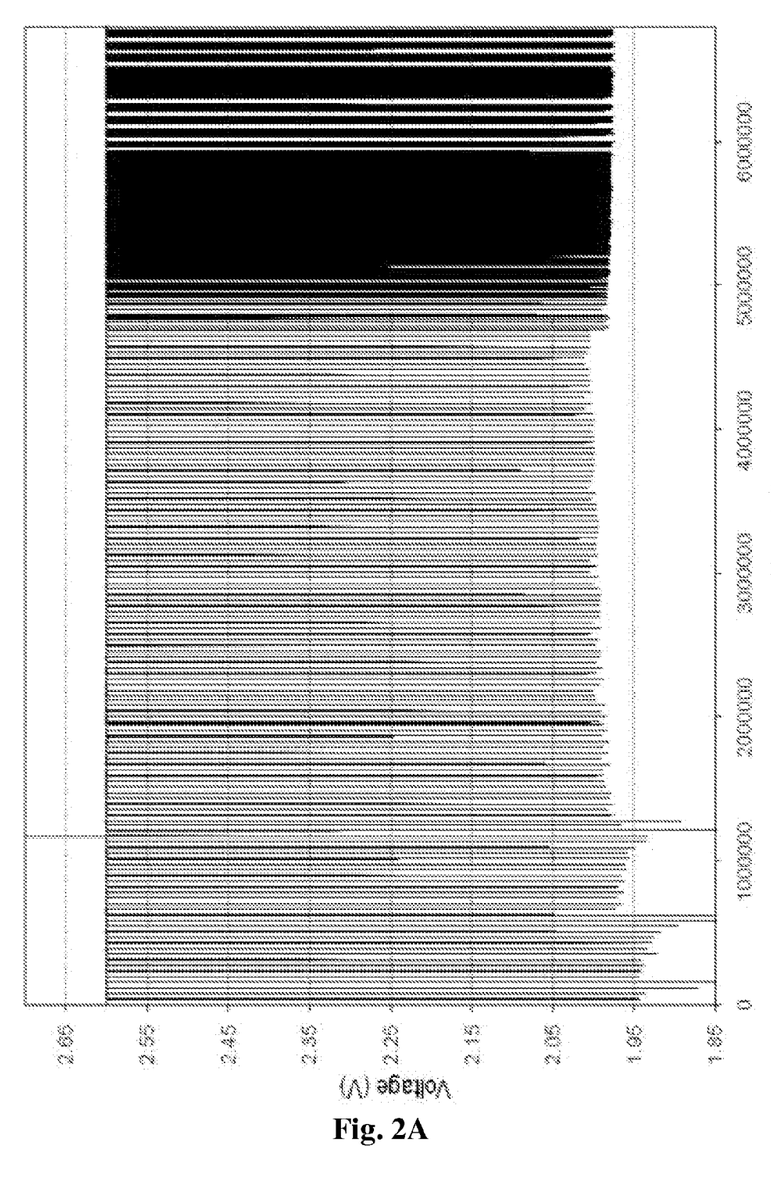
FIGS. 2A-D depict: voltage vs. time and number of cycles of improved lead acid cell with a cathode modified by CNT according to the invention (FIG. 2A); a section of the voltage profiles vs. time of FIG. 2A (FIG. 2B); voltage vs. time and number of cycles of a regular reference battery (FIG. 2C); and a section of the voltage profiles vs. time to FIG. 2C (FIG. 2D).
Figure 2B:
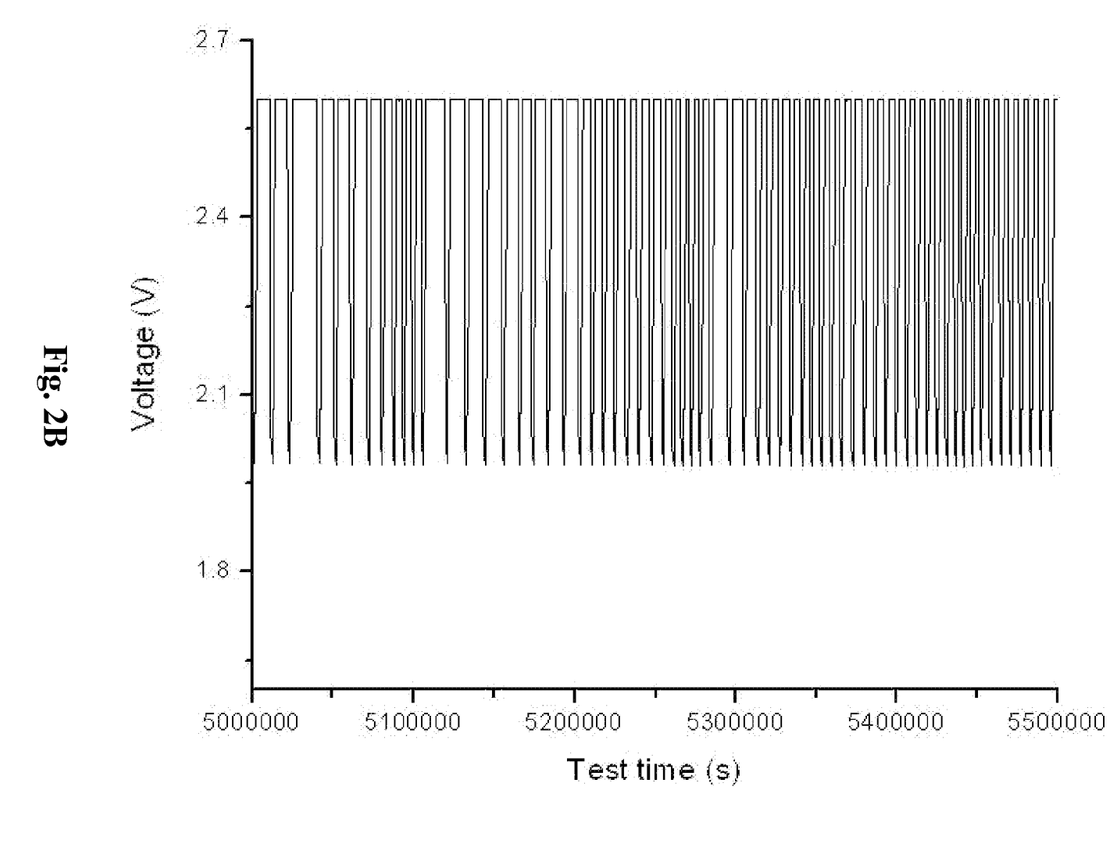

The cycling of lead acid cells, which consisted of improved lead acid cathodes according to the invention, is shown in FIGS. 2A-D. Following a short stabilization span, the studied cells demonstrated constant voltage profile through most of their life span, ending in fast voltage drop during the last tens of discharge cycles. FIG. 2A shows voltage vs. time and number of cycles of the improved batteries. FIG. 2B shows a section of the voltage profile for a selected range of number of cycles.

Figure 2C:
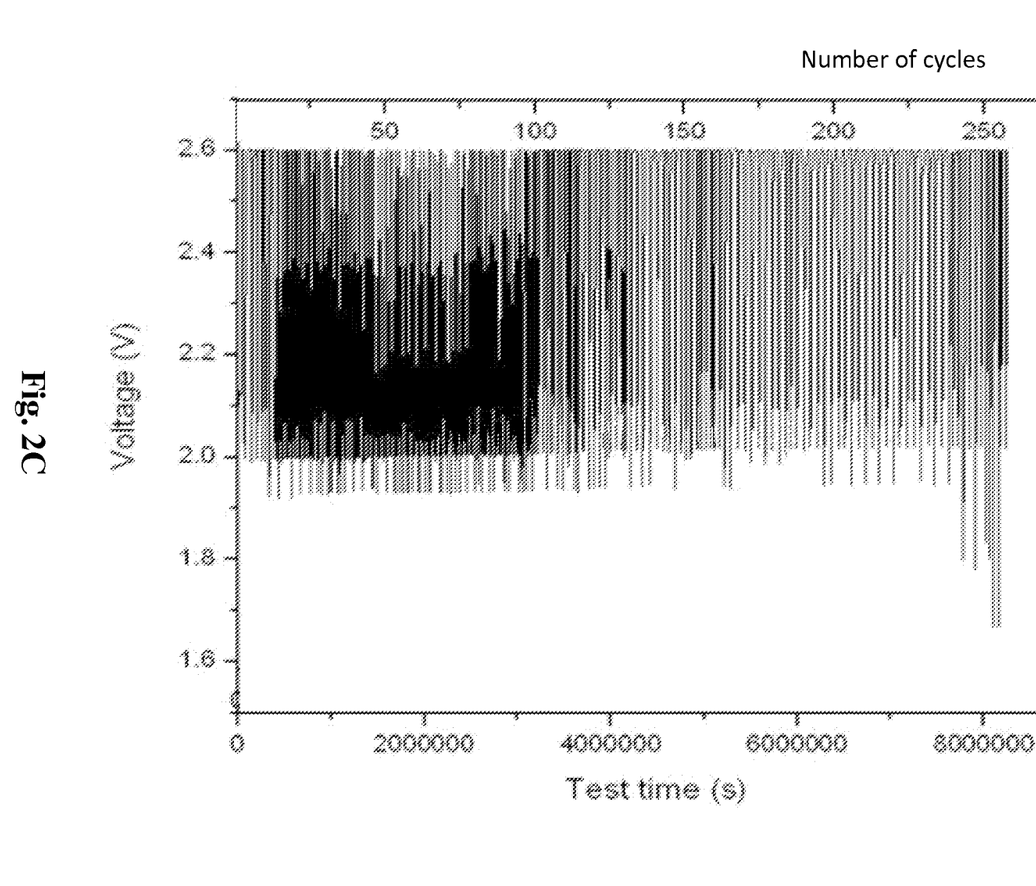
Figure 2D:
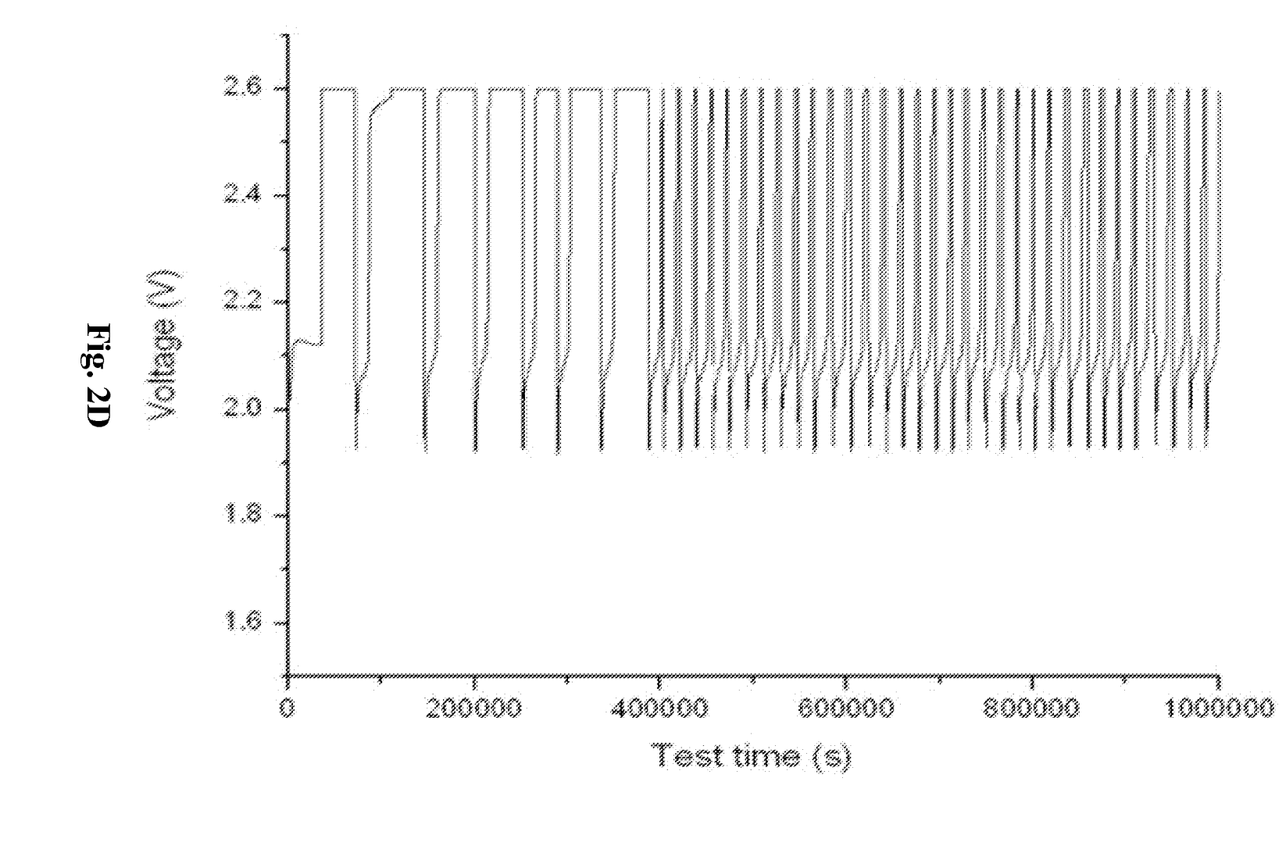

In comparison, FIG. 2C shows voltage vs. time and number of cycles of regular (reference) batteries. FIG. 2D shows typical voltage profiles of selected cycles.

A drop of voltage below 1.6V with proper voltage profile derivative (to avoid voltage spikes) was considered as failure of the cell. Measurements were performed for 387 cycles when the discharged was carried out at C rate of up to DOD of 33% from the initial cathode capacity with CC/CV (C/2 until 2.4V followed by 2.4V until 0.0055A/g) recharging. This value (387 cycles) was twice than that obtained by Vulcan auxiliary cathode (180 cycles) or 240 cycles, which were measured for the same cathode without the CNTs before failure. The Vulcan auxiliary cathode was composed of a lead-alloy grid and a paste mixture comprising lead, lead oxide, lead sulfates and Dynel® 1/16. HRSEM supplemented by EDAX showed the presence of large $PbSO_4$ crystals combined with small quantities of submicron crystals, proving (as expected) that the auxiliary cathodes (without CNTs) failed due to the common combined sulfation-crumbling mechanisms. In contrast, CNTs-impregnated cathodes exhibited only sub-micron crystals formation with absence of clear peak of sulfur. These results indicate a shift of the failure mechanism from combined sulfation-crumbling, exclusively to crumbling.

The kinetic energy provided by the planetary centrifugal mixing using sub-micrometer scale of the LO powder as the ball milling agent, is in the order $10^8$ times lower as compared with the conventional ball milling using millimeter scale zirconia (given that the mass is related to radius to the power of three $10^9$ and the utilized revolution speed of the disk $10^{-1}$ rpm, which determine the lead oxide ball velocity, neglecting the difference in the density between lead oxide and zirconia). This less impactful, but much better distributed milling (proportional to the number of particles) led to the homogeneous mixture of LO with undamaged oxidized CNTs.

Regarding the LO-PTAA-CNT dispersion with the high power sonication, (as described in [4] and without wishing to be bound by theory), high energy localized bubbles form and collapse against the PTAA-CNT surface, creating a high energy jet of vapor (up to a few hundred meters per second at thousands of degrees Celsius). However, due to the low mass of these jets, they attack only the exposed interfacial PTAA instead of the CNTs cores themselves.

As opposed to the rigid CNTs, the soft PTAA absorbs and distributes the ultrasonic shock wave energy, retaining the CNTs undamaged. In addition, based on the PTAA coating mechanism, due to the chemical inertness of the typical basal planes of CNTs, the polymerization of the thin (<2-3 nm) PTAA coating initiates from the oxidized defect sites on the CNTs [10]. This fact, pin-points the protection mainly to the weakest points of protected CNTs, namely the interfacial PTAA. As can be seen in FIG. 1, the CNTs remained undamaged despite enhancement of the cleavage effect by the introduction of a lead-oxide powder.

The cyclability profile of the CNTs impregnated electrodes may include stabilization and rearrangement of the electrode structure via dissolution/precipitation and penetration of the acid solution into cavities. Later-on, through most of the cell life span, the actual DOD gradually increases due to continuing degradation of the active material. This gradual degradation does not appear (e.g. reduction in the voltage profile) until the few last tens of cycles, most probably because of the fast kinetic nature of the aquatic battery (which most probably enhanced via the CNT ability to act as electro-osmotic pumps that facilitate acid diffusion in the inner volume of the active material), enabling to compensate and provide the same voltage during the discharge stage.

Finally, the active material degradation reaches a critical conversion degree which may not be compensating any more by the fast kinetic of the lead acid aquatic battery. The combination of the actual DOD with the fact that the crumbling failure mechanisms step up significantly as a function of the actual DOD, results in considerable fast degradation and decrease in the discharge voltage at the end of the battery life span.

A postmortem analysis of the cathode revealed that the combination of the CNTs electric conductivity, along with their homogeneous dispersion above the dynamic percolation critical concentration and their modification to properly wet LO, renders the cathode with the following characteristics:

1) most of the crystals remain in submicron size, thereby preventing degradation of the cathode's performance; and 2) the sulfur amount was below the EDAX detection level, indicating that it is likely that the modified CNTs managed to form a non-continuous conductive spatial arrangement throughout the PAM with half pitch lower than 1 μm.

Figure 3A:
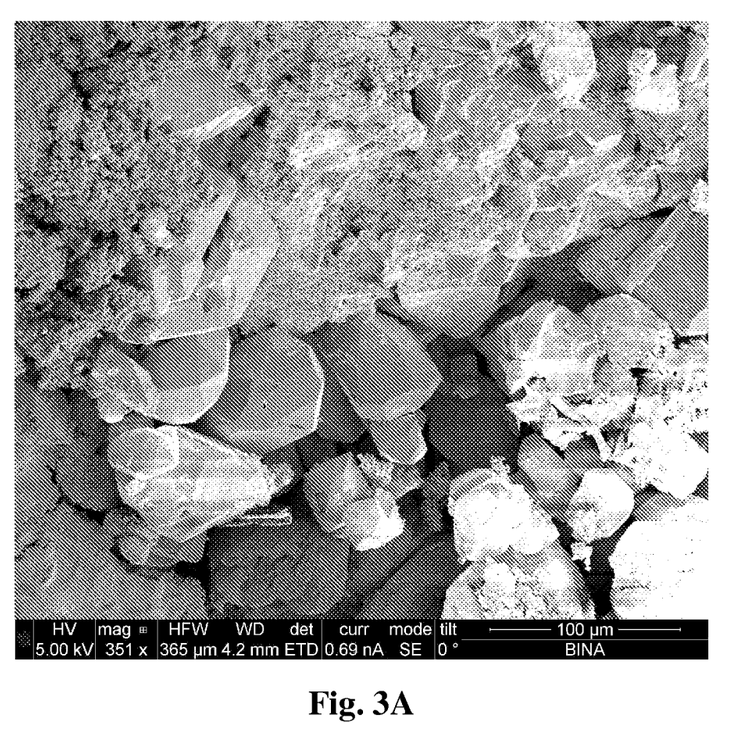
FIGS. 3A-B provide SEM images demonstrating combined sulfation-crumbling mechanisms of CNT free electrode (FIG. 3A) and exclusively crumbled (disintegrated) electrode after introduction of CNTs (FIG. 3B).
Figure 3B:
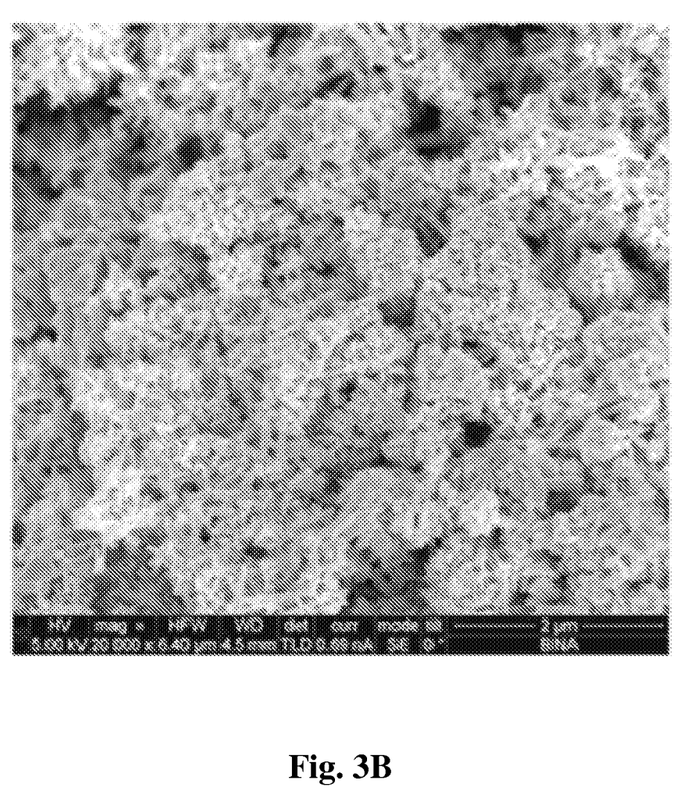

Formation of such condense (such sub micron scale) conducting arrangement enables the CNTs to behave as "electron sinks", enabling the creation of required available oxidation sites (taking into account the limited ability of the $PbSO_4$ to conduct the required amount of electrons along a distance of 1-1.5 μm). These oxidation sites directly bypass the sulfation failure mechanism, resulting in improved cycle life and shifting from the "normal" combined failure mechanism (FIGS. 3A-B). The difference between the image shown in FIG. 3A and that in FIG. 3B indicate a clear change in the battery failure mechanism from combined sulfation and crumbling to pure crumbling due to the addition of the functionalized CNTs.

Example 2

CNTs Functionalized by Oxidation

Preparation of Reference Cells

Both positive and negative electrodes were prepared from leady oxide (LO, i.e. a mixture of $PbO_x$ with $1 \leq x \leq 2$) which was produced in a commercial Barton pot by Vulcan Inc (Israel, a LA batteries manufacturer). For the positive electrode mixture, LO was mixed with Dynel® 1/8 (0.2 wt. % vs. the LO). For the negative electrode mixture, LO was mixed with Dynel® 1/16 (0.06 wt. % vs. the LO) and an expander consisting of $BaSO_4$ and carbon black (0.75 wt. %—vs. the LO; VULCA01 by Hammond;). During mixing, distilled water (150 μg/g LO powder) and $H_2SO_4$ (16 μl/g LO powder; 1.84 sp.gr.) were added to both positive electrode mixture and negative electrode mixture to form respective pastes.

After short stirring and waiting for one hour at room temperature, 3 g of the positive electrode mixture and 10 g of the counter negative electrode mixture were manually pasted on lead grids (4 and 10 $cm^2$ respectively; 1.3 mm wide), which were extruded from commercial lead acid battery grids. T The electrodes were then compressed between Teflon® sheets (3 ton; 3 min) and cured in two stages: first at 55° C. at 100% relative humidity (RH) for 48 hours, followed by 55° C. at 20% RH for 24 additional hours. These conditions form tribasic lead sulfate crystals ($3PbO \cdot PbSO_4$) since the process temperature is lower than the transition temperature to form tetrabasic lead sulfate ($4PbO \cdot PbSO_4$).

The cured electrodes were then immersed in a polypropylene test tube with microscope glass slide as a separator in $H_2SO_4$ solution (3M) for 18 hours aiming towards forming only β structure followed by constant-current/constant voltage (CC/CV) formation (i.e. C/2 till 2.3 V followed by polarization to 2.3 V until the current is reduced to 5 mA).

Synthesis of positive electrode comprising oxidized CNTs:

Composite positive electrodes were prepared in a similar way, with the addition of oxidized MWCNTs (from Arkema; 10 nm in diameter and 1-10 μm in length; 1% wt of LO) that were added to the LO powder and the Dynel® blend. The mixture with the CNTs was then inserted to a planetary centrifugal vacuum mixer (ARV-310 by Thinky) and mixed for 2 minutes at 1000 rpm at atmospheric conditions. From this, we then positive electrode mixture for electrodes was prepared as described above for the reference cells.

Figure 4:
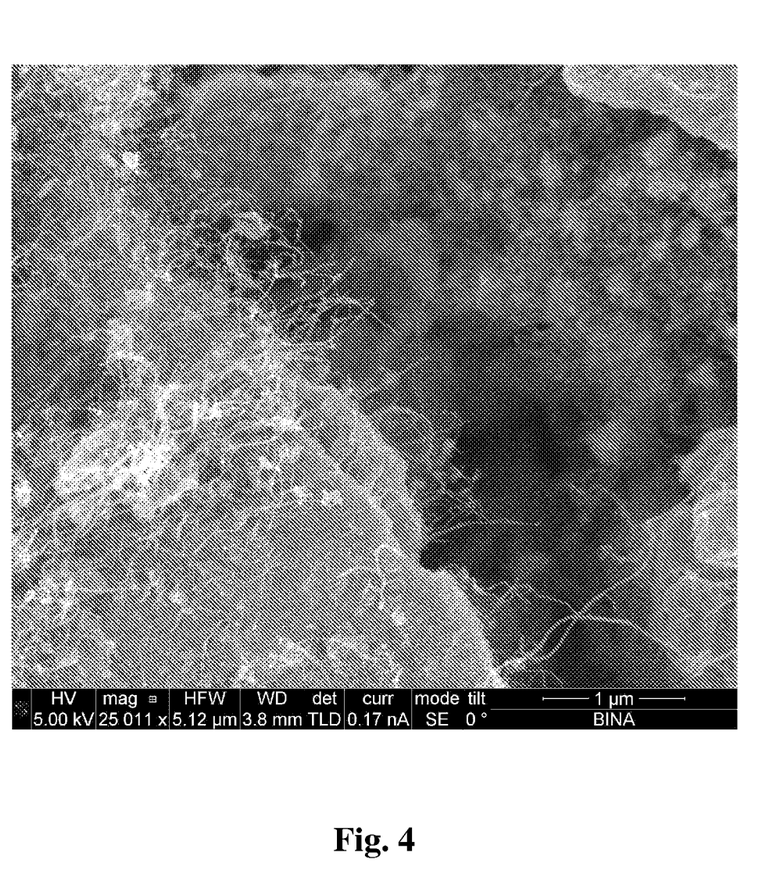
FIG. 4 shows a SEM image of homogenously-mixed CNTs and leady oxide.
Figure 5A:
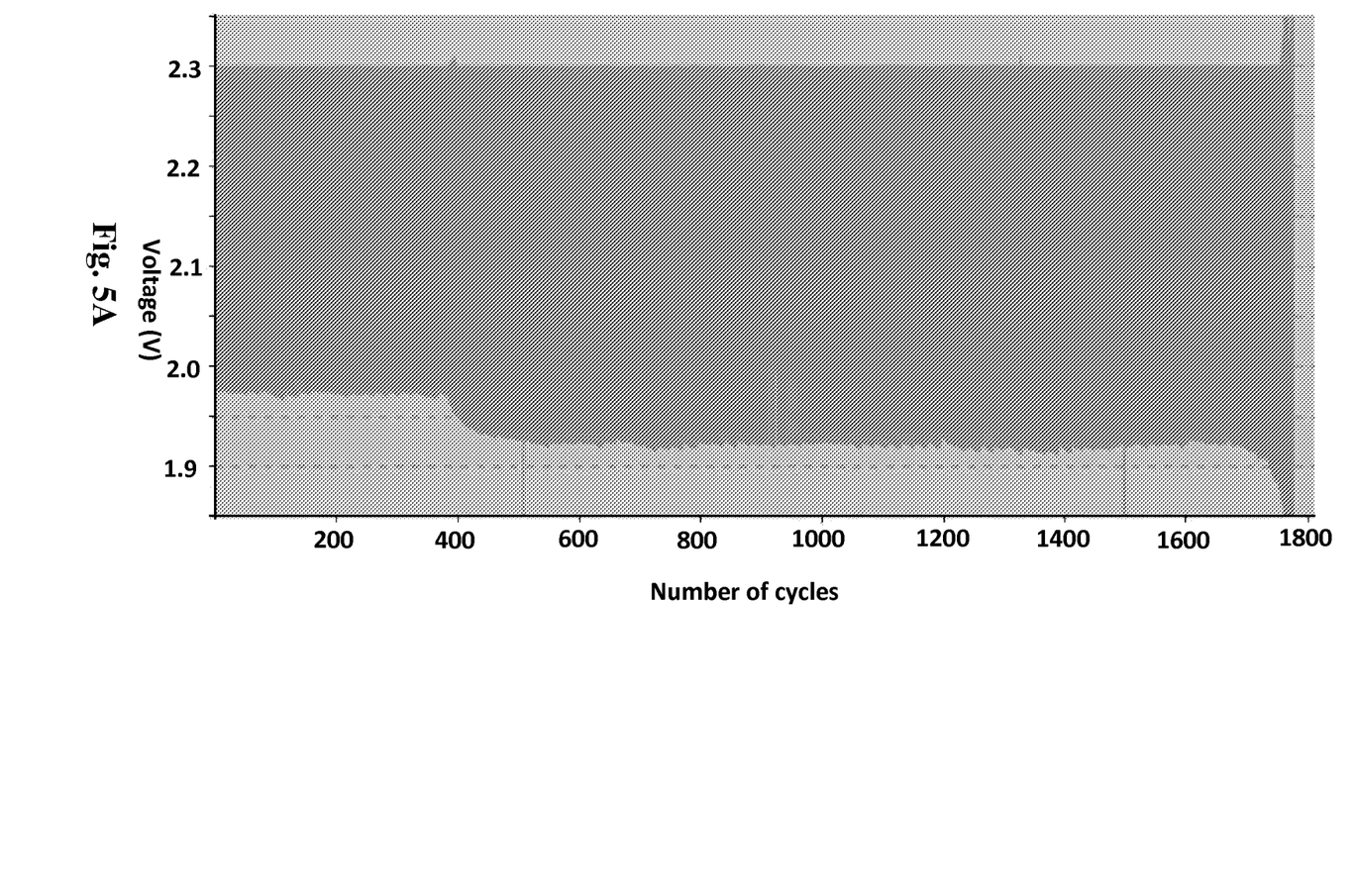
FIGS. 5A-B depict: voltage vs. time and number of cycles of improved lead acid cell with a cathode modified by CNT according to the invention (FIG. 5A); and a section of the voltage profiles vs. time of FIG. 5A (FIG. 5B).
Figure 5B:
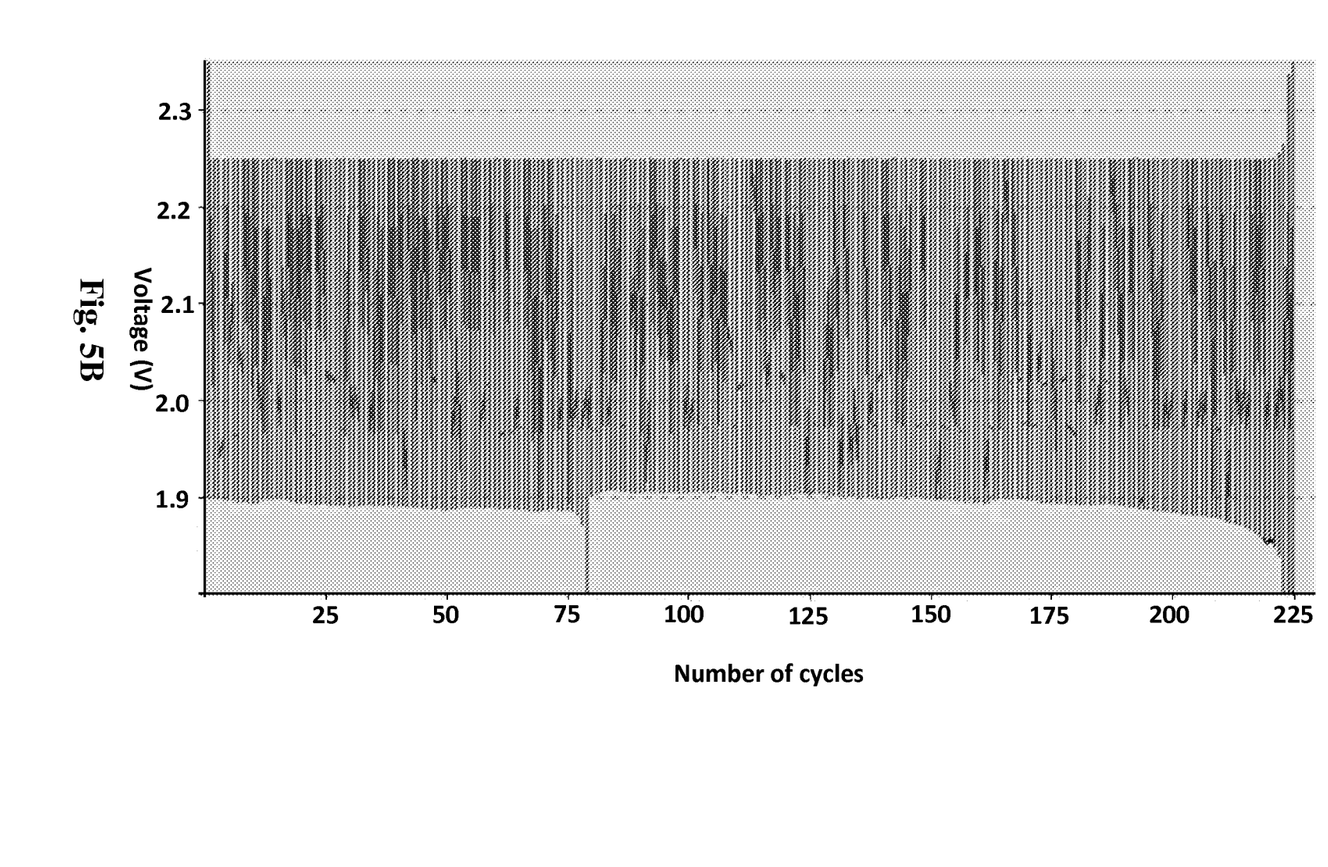

Results:

Following homogenous mixing of the CNTs and the leady oxide (FIG. 4), which was obtained utilizing the micro PbO powder as the grinding agent similarly to ball milling followed by standard formation an improvement of 700% in cycle life of the studied lead acid flooded cell cathodes was demonstrated (FIG. 5).

The invention claimed is:

1. A composite, comprising:
   lead oxide particles ($PbO_2$) haying a particle size is between about 0.2 and 2 microns; and
   functionalized carbon nanotubes (CNTs) haying a diameter of between about 8 and 15 nm, and a length of between about 1 and 50 μm and being randomly distributed in and spaced-apart in said composite, functionalization of the CNTs being by oxygen-containing groups, each functionalized CNT being coated with a plurality of said lead oxide particles.

2. The composite according to claim 1, wherein the functionalized CNTs are separated from each other by a plurality of lead oxide particles coating each functionalized CNT.

3. The composite according to claim 1, wherein the functionalized CNTs form a discontinuous spatial arrangement.

4. The composite according to claim 1, wherein each functionalized CNT is distanced from another by no more than 2 microns.

5. The composite according to claim 4, wherein each functionalized CNT is distanced from the other by no more than 1 micron.

6. The composite according to claim 1, wherein the CNTs are selected from single-walled carbon nanotubes (SWNTs), multi-walled carbon nanotubes (MWNTs), double-walled carbon nanotubes (DWNTs), and few-walled carbon nanotubes (FWNTs).

7. The composite according to claim 6, wherein the CNTs are SWNTs or MWNTs CNTs.

8. The composite according to claim 1, wherein the oxygen-containing groups are selected from carboxyl and hydroxyl groups.

9. An electrode assembly, comprising: the composite according to claim 1.

10. The electrode assembly according to claim 9, wherein the composite is in the form of a paste.

11. The electrode assembly according to claim 9, wherein the composite is an electrode active material.

12. A composition, comprising: the composite according to claim 1, and an acidic medium.

13. The composite composition according to claim 12, wherein said acidic medium is sulfuric acid.

14. An electrode, comprising: a composite according to claim 1.

15. The electrode according to claim 14, being a cathode.

16. An energy storage device, comprising: at least one electrode comprising a composite according to claim 1.

17. The energy storage device according to claim 16, being a lead-acid battery.

18. The energy storage device of claim 17, wherein said lead-acid battery is operational for at least 150 cycles of operation between charging at 14V and discharging at 10.5V, at 25%±0.3% Depth of Discharge (DOD) of the battery.

19. A lead acid battery system, comprising: one or more positive and negative electrodes, at least one of said electrodes being an electrode according to claim 14; separator means disposed between said electrodes; an electrolyte solution being substantially in contact with said electrodes and separator means; and a housing.

20. A composite according to claim 1, in the form of a paste.

* * * * *